(12) United States Patent
Nukada et al.

(10) Patent No.: US 12,448,914 B2
(45) Date of Patent: Oct. 21, 2025

(54) POWER UNIT

(71) Applicant: HONDA MOTOR CO., LTD., Tokyo (JP)

(72) Inventors: Yoshitaka Nukada, Tokyo (JP); Hitoshi Yokotani, Tokyo (JP); Masaru Odajima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/129,439

(22) Filed: Mar. 31, 2023

(65) Prior Publication Data

US 2023/0313734 A1 Oct. 5, 2023

(30) Foreign Application Priority Data

Mar. 31, 2022 (JP) ................. 2022-061351

(51) Int. Cl.
*F02B 67/06* (2006.01)
(52) U.S. Cl.
CPC .................. *F02B 67/06* (2013.01)
(58) Field of Classification Search
CPC ...................................... F02B 67/06

USPC ...................................... 123/198 R
See application file for complete search history.

(56) References Cited

U.S. PATENT DOCUMENTS 4,997,409 A * 3/1991 Sonoda ............... F02B 37/02
474/134
6,186,109 B1 * 2/2001 Matsuno ............. F02B 67/04
123/192.1

FOREIGN PATENT DOCUMENTS

JP 2007-198139 A 8/2007
WO WO-2014026682 A1 * 2/2014 ............. F02B 67/04

* cited by examiner

*Primary Examiner* — Lindsay M Low
*Assistant Examiner* — Omar Morales
(74) *Attorney, Agent, or Firm* — Paratus Law Group, PLLC

(57) ABSTRACT

A power unit has an internal combustion engine and a first auxiliary machine. The internal combustion engine includes a crankshaft and a balancer shaft. The first auxiliary machine operates on rotational power generated in the internal combustion engine. The first auxiliary machine is driven by rotational power of the balancer shaft.

3 Claims, 13 Drawing Sheets

POWER UNIT

CROSS-REFERENCE TO RELATED APPLICATIONS

This application is based on and claims priority under 35 USC 119 from Japanese Patent Application No. 2022-061351 filed on Mar. 31, 2022. The entire content of the priority application is incorporated herein by reference.

TECHNICAL FIELD

The present disclosure relates to a power unit which includes an internal combustion engine and which is to be mounted on a vehicle or the like.

BACKGROUND ART

A power unit including an internal combustion engine is mounted on a vehicle or the like.

In this type of the power unit, there is known a power unit including an auxiliary machine that operates on power generated in an internal combustion engine. For example, JP2007-198139A discloses a power unit including an internal combustion engine and a plurality of auxiliary machines that operate on rotational power of a crankshaft of the internal combustion engine.

Since the power unit described in JP2007-198139A includes a plurality of auxiliary machines that operate on the rotational power of the crankshaft, the plurality of auxiliary machines are disposed in the vicinity of the crankshaft. Therefore, there is a limitation on the degree of flexibility in designing the power unit.

SUMMARY

The present disclosure provides a power unit that improves the degree of flexibility in designing the power unit without increasing the cost.

The present disclosure relates to a power unit including:
an internal combustion engine including a crankshaft and a balancer shaft; and
a first auxiliary machine configured to operate on rotational power generated in the internal combustion engine,
in which the first auxiliary machine is driven by rotational power of the balancer shaft.

According to the present disclosure, the degree of flexibility in designing the power unit is improved without increasing the cost.

BRIEF DESCRIPTION OF DRAWINGS

Exemplary embodiment(s) of the present disclosure will be described in detail based on the following figures, wherein.

DESCRIPTION OF EMBODIMENTS

Figure 1:
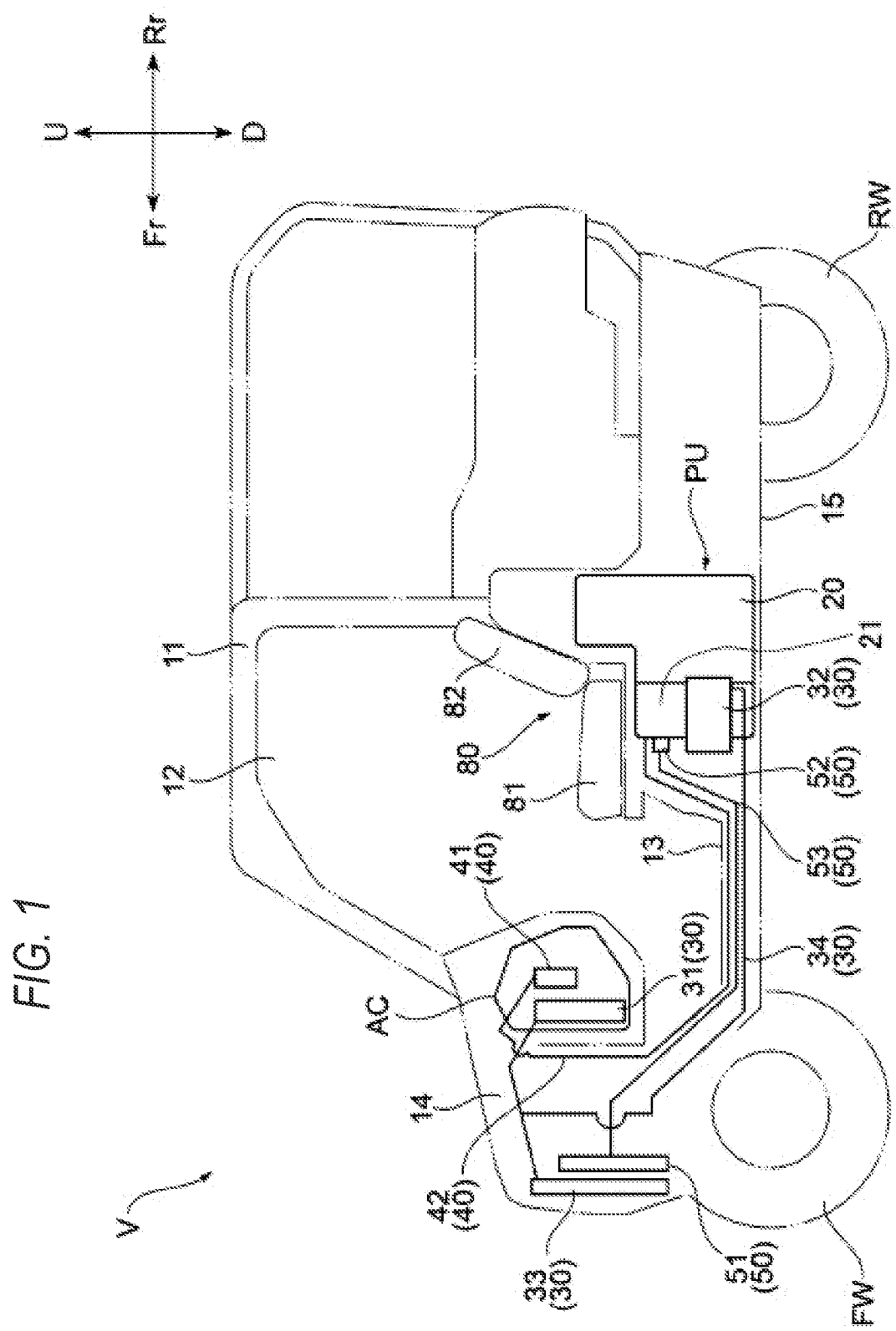
FIG. 1 is a schematic view of a cross section of a main part of a vehicle on which a power unit according to an embodiment of the present disclosure is mounted, as viewed from the left.
Figure 2:
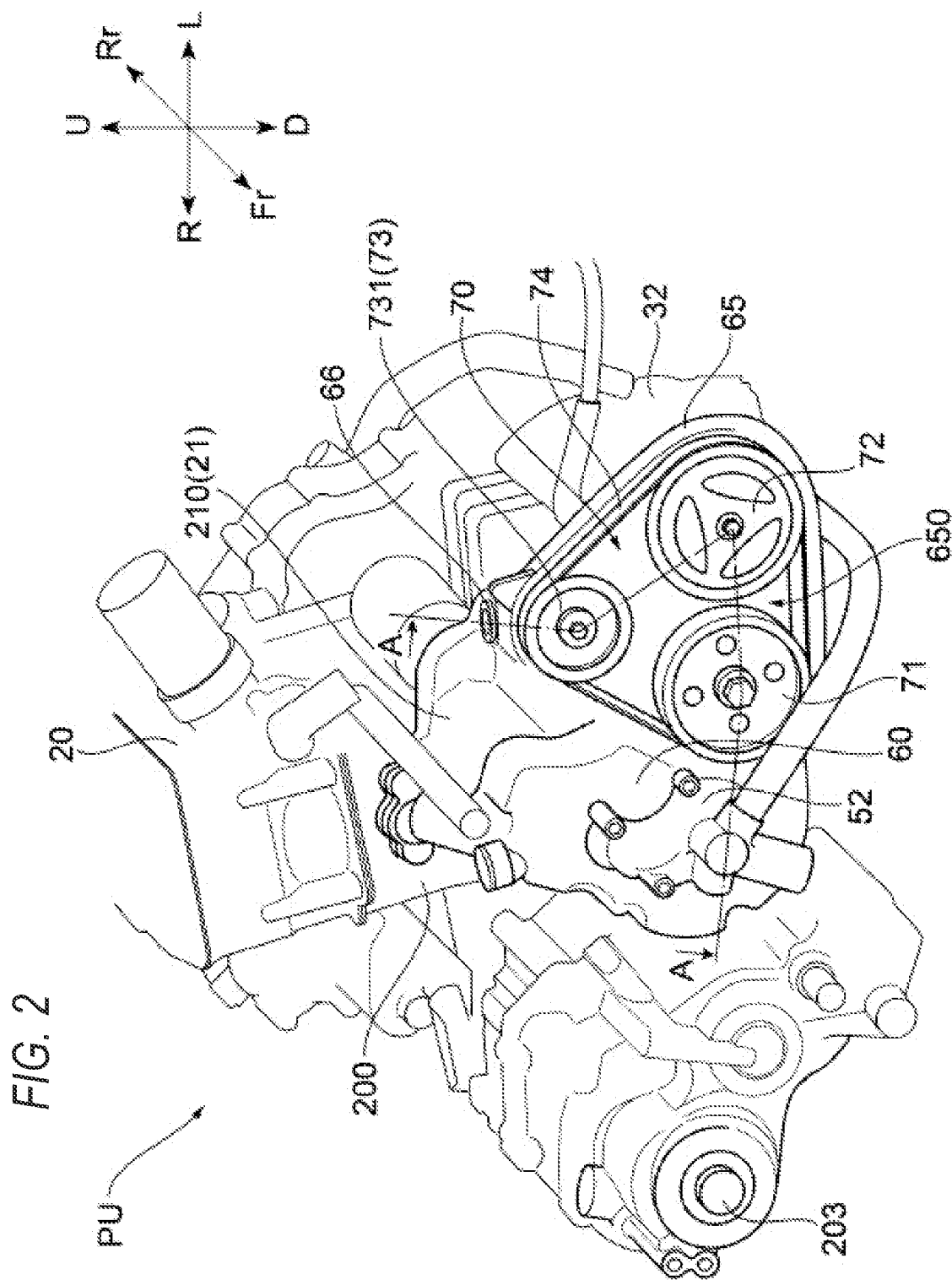
FIG. 2 is a perspective view of the power unit in FIG. 1.
Figure 3:
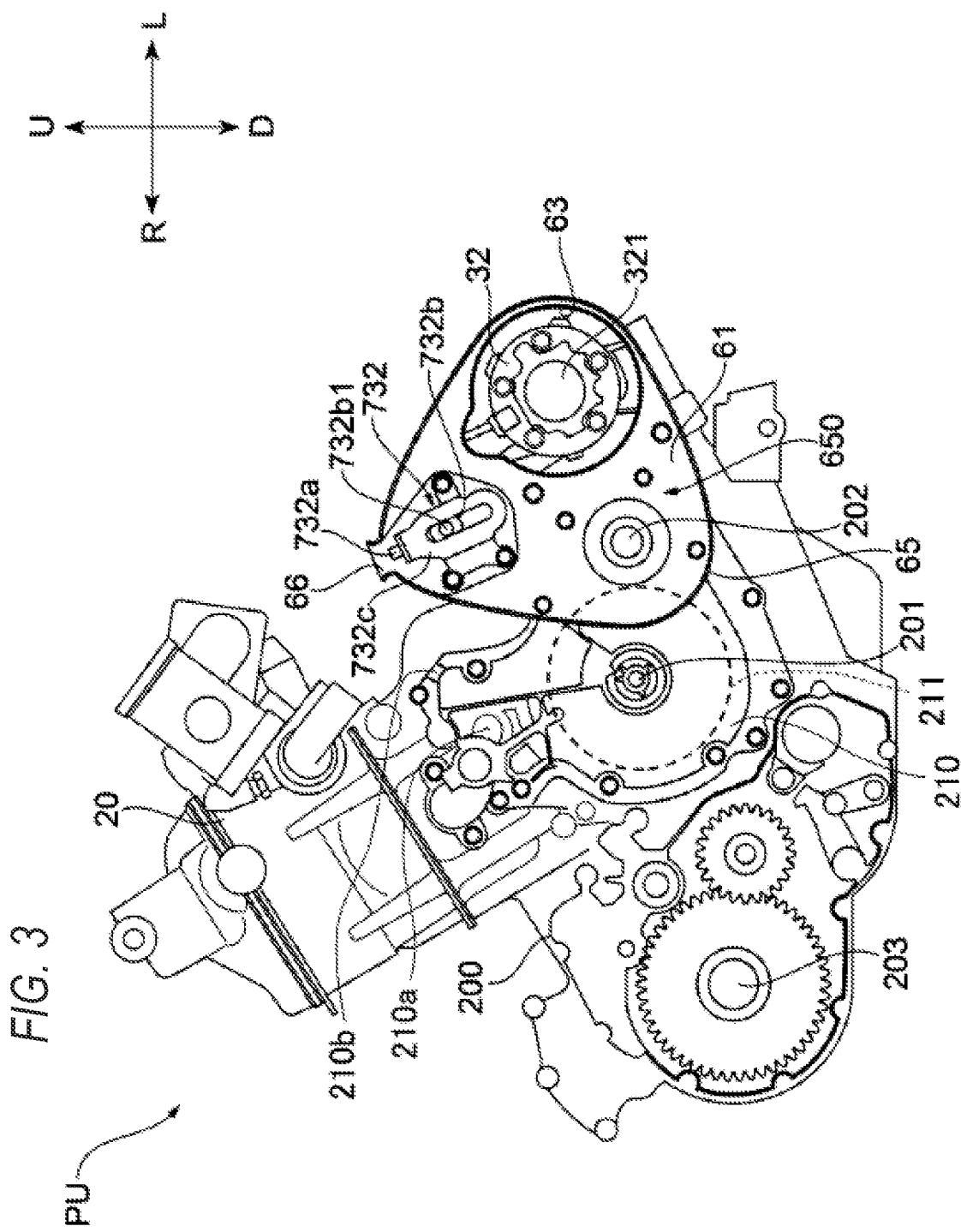
FIG. 3 is a sectional view of a main part of the power unit in FIG. 2 as viewed from the front.

Hereinafter, a vehicle on which a power unit according to an embodiment of the present disclosure is mounted will be described with reference to the accompanying drawings. It should be noted that the drawings are viewed in direction of reference numerals. In the present description and the like, in order to simplify and clarify the descriptions, a front-rear direction, a left-right direction, and an upper-lower direction are described in accordance with directions viewed from a driver of the vehicle. In the drawings, a front side of the vehicle is denoted by Fr, a rear side thereof is denoted by Rr, a left side thereof is denoted by L, a right side thereof is denoted by R, an upper side thereof is denoted by U, and a lower side thereof is denoted by D.

<Vehicle>

As shown in FIG. 1, a vehicle V on which a power unit PU according to the present embodiment is mounted is, for example, a rough road traveling vehicle capable of traveling on a rough road. The vehicle V includes a front wheel FW, a rear wheel RW, a vehicle body frame 11, a vehicle cabin 12 surrounded by the vehicle body frame 11, a floor panel 13 forming a floor surface of the vehicle cabin 12, and a front room 14 formed in front of the vehicle cabin 12. A seat 80 is provided in the vehicle cabin 12. The power unit PU including an internal combustion engine 20 that drives the front wheel FW, a cooling device 30 that cools the inside of the vehicle cabin 12, a heating device 40 that heats the inside of the vehicle cabin 12, and an internal combustion engine cooling device 50 that cools the internal combustion engine 20 of the power unit PU are mounted on the vehicle V.

The cooling device 30 includes an evaporator 31, a compressor 32, a condenser 33, and an expansion valve (not shown). The cooling device 30 further includes a cooling refrigerant pipe 34 through which a cooling refrigerant circulates through the evaporator 31, the compressor 32, the condenser 33, and the expansion valve (not shown). The cooling refrigerant flows through the cooling refrigerant pipe 34. The cooling refrigerant flows through the cooling refrigerant pipe 34 and circulates through the evaporator 31, the compressor 32, the condenser 33, and the expansion valve (not shown).

The cooling refrigerant is compressed by the compressor 32 and heated, and then is cooled by the condenser 33 exchanging heat with the outside air. Then, the cooling refrigerant expands by the expansion valve, further lowers in temperature, and is supplied to the evaporator 31. Then, the air passing through the evaporator by a fan or the like is cooled by the cooling refrigerant flowing through the evaporator and is supplied to the vehicle cabin 12. The cooling refrigerant flowing through the evaporator 31 returns to the compressor 32.

The internal combustion engine cooling device 50 includes a radiator 51 and a water pump 52. The internal combustion engine cooling device 50 further includes an internal combustion engine coolant pipe 53 through which an internal combustion engine coolant circulates through the internal combustion engine 20, the radiator 51, and the water pump 52. Therefore, the internal combustion engine coolant pipe 53 connects the internal combustion engine 20, the radiator 51, and the water pump 52. The internal combustion engine coolant flows through the internal combustion engine coolant pipe 53. The internal combustion engine coolant flows through the internal combustion engine coolant pipe 53 and circulates through the internal combustion engine 20, the radiator 51, and the water pump 52.

The internal combustion engine coolant is cooled by exchanging heat with the outside air in the radiator 51, and is pressure-fed into the internal combustion engine 20 by the water pump 52. Then, the internal combustion engine coolant pressure-fed by the water pump 52 flows inside the internal combustion engine 20, absorbs heat of the internal combustion engine 20, cools the internal combustion engine 20, and returns to the radiator 51 again.

The heating device 40 includes a heater core 41. The heating device 40 further includes a heating liquid pipe 42 through which a heating liquid circulates through the internal combustion engine 20 and the heater core 41. A valve device (not shown) is provided in the heating liquid pipe 42.

When the valve device (not shown) of the heating device 40 is opened, the internal combustion engine coolant of the internal combustion engine cooling device 50, which has cooled the internal combustion engine 20 and has been heated, flows into the heating liquid pipe 42, flows through the heating liquid pipe 42, and is supplied to the heater core 41.

Then, the air passing through the heater core 41 by a fan or the like is heated by the internal combustion engine coolant flowing through the heater core 41 and is supplied to the vehicle cabin 12. The internal combustion engine coolant flowing through the heater core 41 returns to the internal combustion engine 20.

The evaporator 31 of the cooling device 30 and the heater core 41 of the heating device 40 are accommodated in an air conditioner unit AC provided in the front room 14 in a manner of being adjacent to a front portion of the vehicle cabin 12. In other words, the air conditioner unit AC includes the evaporator 31 of the cooling device 30 and the heater core 41 of the heating device 40. The cooling refrigerant pipe 34 connects the evaporator 31 of the air conditioner unit AC to the compressor 32. The heating liquid pipe 42 connects the heater core 41 of the air conditioner unit AC to the internal combustion engine 20.

The condenser 33 of the cooling device 30 and the radiator 51 of the internal combustion engine cooling device 50 are provided in the front portion of the front room 14.

The internal combustion engine 20 and the water pump 52 of the power unit PU, and the compressor 32 are disposed behind the front room 14 and below the floor panel 13 such that at least a part thereof is below the seat 80.

The cooling refrigerant pipe 34 of the cooling device 30, the internal combustion engine coolant pipe 53 of the internal combustion engine cooling device 50, and the heating liquid pipe 42 of the heating device 40 extend below the floor panel 13 in a front-rear direction.

<Configuration of Power Unit>

Next, the configuration of the power unit PU will be described with reference to FIGS. 2 to 6.

As shown in FIGS. 2 to 6, the power unit PU is a unit in which the internal combustion engine 20, an ACG unit 21 (ACG: Alternating Current Generator), the compressor 32 of the cooling device 30 described above, and the water pump 52 of the internal combustion engine cooling device 50 described above are modularized. Both the compressor 32 of the cooling device 30 and the water pump 52 of the internal combustion engine cooling device 50 are driven by rotational power generated in the internal combustion engine 20.

The internal combustion engine 20 is a reciprocating engine including a crankshaft 201, a balancer shaft 202, and an output shaft 203. The internal combustion engine 20 further includes a crankcase 200 that accommodates the crankshaft 201, the balancer shaft 202, and at least a part of the output shaft 203.

A rotation axis of the balancer shaft 202, a rotation axis of the crankshaft 201, and a rotation axis of the output shaft 203 are parallel to one another and extend in the front-rear direction of the vehicle V.

The crankshaft 201 rotates as the fuel gas supplied to the internal combustion engine 20 ignites and the combustion gas expands. The balancer shaft 202 is connected to the crankshaft 201 via a gear or the like (not shown). The balancer shaft 202 is an eccentric shaft coupled to the crankshaft 201 by a gear or the like (not shown), and rotates at the same speed as the crankshaft 201. A rotation direction of the crankshaft 201 and a rotation direction of the balancer shaft 202 are opposite to each other. When the balancer shaft 202, which is an eccentric shaft, rotates together with the rotation of the crankshaft 201, vibration generated due to the rotation of the crankshaft 201 can be prevented in the internal combustion engine 20. The output shaft 203 is a shaft that is rotated by the rotational power of the crankshaft 201. One end portion of the output shaft 203 protrudes to the outside of the crankcase 200, and outputs the rotational power of the crankshaft 201 to the outside of the internal combustion engine 20. The one end portion of the output shaft 203 is coupled to a propeller shaft 22 (see FIGS. 11 and 12), and the rotational power output from the output shaft 203 is transmitted to the front wheel FW via the propeller shaft 22.

The ACG unit 21 includes a rotary electric machine 211 and an ACG cover 210 that accommodates the rotary electric machine 211. The rotary electric machine 211 is a generator capable of generating electric power by the rotational power of the crankshaft 201. The rotary electric machine 211 may be capable of starting the internal combustion engine 20 by rotating the crankshaft 201 of the internal combustion engine 20.

The ACG unit 21 is provided at a position overlapping the crankshaft 201 when viewed in the front-rear direction parallel to a rotation axis direction of the crankshaft 201.

The rotary electric machine 211 is coupled to a front end portion of the crankshaft 201. Therefore, the rotary electric machine 211 rotates coaxially and integrally with the crankshaft 201.

The ACG cover 210 covers an outer peripheral surface and a front surface of the rotary electric machine 211, and is fixed to the crankcase 200.

The compressor 32 has a substantially cylindrical shape extending in the front-rear direction. The compressor 32 includes a rotary shaft 321, and is a compressor that compresses the cooling refrigerant by the rotation of the rotary shaft 321. A rotation axis of the rotary shaft 321 is parallel to the rotation axis of the balancer shaft 202, the rotation axis of the crankshaft 201, and the rotation axis of the output shaft 203, and extends in the front-rear direction of the vehicle V.

The internal combustion engine 20 and the compressor 32 are disposed to place the balancer shaft 202 between the compressor 32 and the crankshaft 201. In the present embodiment, the crankshaft 201 is disposed to the right of the balancer shaft 202, and the compressor 32 is disposed to the left of the balancer shaft 202.

The power unit PU further includes an auxiliary machine stay 60 that supports the compressor 32. The auxiliary machine stay 60 is fixed to the ACG cover 210.

The auxiliary machine stay 60 includes a cover portion 61 that covers at least a part of a front side of the ACG unit 21 (that is, a side opposite to the internal combustion engine 20 in the front-rear direction of the ACG unit 21), and an extension plate 62 that extends rearward from the cover portion 61.

When viewed from the front, the cover portion 61 covers the front side of the ACG unit 21 and extends to a region overlapping the compressor 32. The cover portion 61 is provided with an insertion hole 63 penetrating through the region overlapping the compressor 32 in the front-rear direction when viewed from the front.

The extension plate 62 is curved along an outer peripheral surface of the compressor 32 between the compressor 32 and the ACG unit 21, and extends in an upper-lower direction and the front-rear direction. The extension plate 62 is provided with support portions 64 that support the compressor 32. Therefore, the support portions 64 are located between the compressor 32 and the ACG unit 21. In the present embodiment, each of the support portions 64 is a fastening hole in which a screw groove is formed so that a bolt can be fastened. In the present embodiment, the support portions 64 are provided at a total of four positions, including two positions aligned in the front-rear direction at an upper end portion of the extension plate 62 and two positions aligned in the front-rear direction at a lower end portion of the extension plate 62. The compressor 32 is provided with bolt insertion holes through which bolts can be inserted corresponding to the respective support portions 64. In a state in which the front end portion of the compressor 32 is inserted through the insertion holes 63 of the extension plate 62, bolts are inserted through the respective bolt insertion holes of the compressor 32 and fastened to the respective support portions 64 of the extension plate 62, whereby the compressor 32 is fixed to the auxiliary machine stay 60 by the support portions 64. Therefore, at least a part of the compressor 32 is disposed at a position overlapping the ACG unit 21 in the front-rear direction when viewed from a radial direction of the crankshaft 201.

Accordingly, since the compressor 32 can be disposed by effectively utilizing a space around the ACG unit 21, the size of the power unit PU can be reduced. Since the size of the power unit PU can be reduced, a space efficiency of the vehicle V is improved.

The extension plate 62 is provided on the auxiliary machine stay 60 and the support portions 64 are provided on the extension plate 62, whereby it is possible to stably support the compressor 32 with a simple configuration.

Further, as described above, the compressor 32 is disposed at a position where at least a part of the compressor 32 overlaps the ACG unit 21 in the front-rear direction when viewed from the radial direction of the crankshaft 201 perpendicular to the front-rear direction, and the support portions 64 are located between the ACG unit 21 and the compressor 32. Accordingly, since after the compressor 32 is disposed at a fixed position, the compressor 32 can be accessed from the left (that is, the side of the compressor 32 opposite to the side on which the ACG unit 21 is disposed) to fix the compressor 32 to the auxiliary machine stay 60, the assembling property is improved.

The power unit PU further includes a transmission device 70 that transmits the rotational power generated in the internal combustion engine 20 to the compressor 32.

The transmission device 70 includes a drive pulley 71 that is rotated by the rotational power generated in the internal combustion engine 20, a driven pulley 72 that rotates about a rotation axis parallel to a rotation axis of the drive pulley 71, a belt tensioner 73 including a tensioner pulley 731 that rotates about a rotation axis parallel to the rotation axis of the drive pulley 71 and the rotation axis of the driven pulley 72, and a transmission belt 74 that is wound around the drive pulley 71, the driven pulley 72, and the tensioner pulley 731.

The rotation axis of the drive pulley 71, the rotation axis of the driven pulley 72, and the rotation axis of the tensioner pulley 731 are all parallel to the rotation axis of the crankshaft 201, and extend in the front-rear direction.

The drive pulley 71, the driven pulley 72, the belt tensioner 73, and the transmission belt 74 are disposed in front of the cover portion 61 of the auxiliary machine stay 60.

The cover portion 61 of the auxiliary machine stay 60 is provided with an accommodation wall 65 that extends forward from the cover portion 61 and surrounds the drive pulley 71, the driven pulley 72, the belt tensioner 73, and the transmission belt 74 when viewed from the front. The auxiliary machine stay 60 is formed with a transmission device accommodating portion 650 surrounded by the accommodation wall 65 when viewed from the front, and the transmission device 70 is accommodated in the transmission device accommodating portion 650.

Accordingly, the transmission device 70 can be protected from dust, water, and the like without increasing the number of components.

In the present embodiment, the drive pulley 71 and the driven pulley 72 are aligned in a left-right direction such that the drive pulley 71 is on a right side and the driven pulley 72 is on a left side. The belt tensioner 73 is disposed to place the rotation axis of the tensioner pulley 731 above the rotation axis of the drive pulley 71 and the rotation axis of the driven pulley 72, and to place the rotation axis of the tensioner pulley 731 between the rotation axis of the drive pulley 71 and the rotation axis of the driven pulley 72 in an extending direction of a first virtual straight line that connects the rotation axis of the drive pulley 71 and the rotation axis of the driven pulley 72 when viewed in the front-rear direction.

Accordingly, since the size of the transmission device 70 in the extending direction of the first virtual straight line can be reduced, the size of the transmission device 70 can be reduced. In the present embodiment, the size of the transmission device 70 in the left-right direction can be reduced.

The transmission device 70 further includes a drive shaft 75 detachably coupled to the balancer shaft 202. In the present embodiment, a front end of the balancer shaft 202 is provided with a coupling portion 202a capable of coupling the drive shaft 75, and the drive shaft 521 of the water pump 52 is detachably coupled to the coupling portion 201a of the crankshaft 201.

The drive pulley 71 is fixed to the drive shaft 75 so as to rotate integrally with the drive shaft 75 on the same rotation axis.

The driven pulley 72 is coupled to the rotary shaft 321 of the compressor 32. Therefore, when the driven pulley 72 rotates, the rotary shaft 321 of the compressor 32 rotates, and the compressor 32 operates.

The belt tensioner 73 is attached to the cover portion 61 of the auxiliary machine stay 60. The belt tensioner 73 further includes an adjuster device 732 that is attached to the cover portion 61 of the auxiliary machine stay 60 and pivotally supports the tensioner pulley 731 in a displaceable manner. The adjuster device 732 is attached to a front surface of the cover portion 61 of the transmission device accommodating portion 650 that is formed at the auxiliary machine stay 60.

The adjuster device 732 includes an adjuster bolt 732a, a movable member 732b that moves in accordance with the rotation of the adjuster bolt 732a, and a support member 732c that slidably supports the movable member.

The adjuster bolt 732a includes a bolt head directed upward and extends in the front-rear direction while being slightly inclined leftward and downward.

When the adjuster bolt 732a rotates, the movable member 732b is displaced along an extending direction of the adjuster bolt. The movable member 732b is provided with a support shaft 732b1 extending in the front-rear direction.

The tensioner pulley 731 is rotatably and pivotally supported by the support shaft 732b1 provided on the movable member 732b of the adjuster device 732. Thus, the tensioner pulley 731 is pivotally supported by the adjuster device 732 attached to the auxiliary machine stay 60.

Therefore, in the adjuster device 732, the movable member 732b is displaced by rotating the adjuster bolt 732a, and the tensioner pulley 731 as viewed in the front-rear direction can be displaced. Further, by rotating the adjuster bolt 732a to adjust the position of the tensioner pulley 731, the tension of the transmission belt 74 that is wound around the drive pulley 71, the driven pulley 72, and the tensioner pulley 731 can be adjusted.

The accommodation wall 65 provided at the cover portion 61 of the auxiliary machine stay 60 is provided with a through hole 66. The through hole 66 is provided in an upper portion of the accommodation wall 65, and at least a part of the through hole 66 is provided at a position overlapping the adjuster bolt 732a when the through hole 66 is viewed from the outside of the transmission device accommodating portion 650. The through hole 66 may be normally plugged by a detachable cap or the like (not shown).

Accordingly, since the belt tensioner 73 can be easily accessed from the outside above the transmission device accommodating portion 650, the tension of the transmission belt 74 can be easily adjusted. In more detail, the adjuster bolt 732a can be easily accessed from the outside of the transmission device accommodating portion 650, and thus the tension of the transmission belt 74 can be easily adjusted.

In the present embodiment, in the cover portion 61 of the auxiliary machine stay 60, an upper portion of the transmission device accommodating portion 650 is recessed rearward, and a length of the upper portion of the accommodation wall 65 in the front-rear direction is longer than that of a left side portion and a right side portion of the accommodation wall 65.

Accordingly, since the through hole 66 provided in the upper portion of the accommodation wall 65 can be enlarged without lengthening the accommodation wall 65 forward, the adjuster bolt 732a can be easily accessed from the outside of the transmission device accommodating portion 650 without increasing the size of the power unit PU.

When the internal combustion engine 20 is driven and the balancer shaft 202 rotates, the rotary shaft 321 of the compressor 32 rotates via the drive shaft 75, the drive pulley 71, the transmission belt 74, and the driven pulley 72, and the compressor 32 operates. The compressor 32 is driven by the rotational power of the balancer shaft 202.

As explained above, the rotational power of the balancer shaft 202 can be transmitted to the compressor 32 by the transmission device 70 with a simple configuration.

Further, since the balancer shaft 202 rotates at the same speed as the crankshaft 201, the compressor 32 designed on the assumption of being driven by the rotational power of the crankshaft 201 can be used. Accordingly, the degree of flexibility in designing the power unit is improved without increasing the cost.

The compressor 32 designed on the assumption of being driven by the rotational power of the crankshaft 201 can be used while ensuring durability.

Since the internal combustion engine 20 and the compressor 32 are disposed to place the balancer shaft 202 between the compressor 32 and the crankshaft 201, the size of the transmission device 70 can be reduced.

Since the compressor 32 can be easily attached to the internal combustion engine 20 by the auxiliary machine stay 60, it is not necessary to design the internal combustion engine 20 exclusively for attaching the compressor 32, the general-purpose internal combustion engine 20 can be used, and the cost of the power unit PU can be reduced.

Since the drive shaft 75 of the transmission device 70 is detachably coupled to the balancer shaft 202, the transmission device 70 can be easily detached from the internal combustion engine 20. Accordingly, since the auxiliary machine stay 60, the transmission device 70, and the compressor 32 can be easily removed from the internal combustion engine 20, the internal combustion engine 20 can be easily applied to a vehicle that does not require the compressor 32, for example, a vehicle on which the cooling device 30 is not mounted.

A rotation direction of the compressor 32 at the time of driving and the rotation direction of the balancer shaft 202 are the same, whereas the rotation direction of the compressor 32 at the time of driving and the rotation direction of the crankshaft 201 are opposite to each other.

Accordingly, since it is possible to omit a rotation direction reversing device that reverses the rotation direction, which has been used in the related art when the compressor 32 is driven by the rotational power of the crankshaft 201, the number of components of the power unit PU can be reduced, the cost of the power unit PU can be reduced, and the size of the power unit PU can be reduced.

A breather chamber 67 that releases an internal pressure of the internal combustion engine 20 is formed in a space surrounded by the cover portion 61 of the auxiliary machine stay 60 and the ACG cover 210. In the present embodiment, the space surrounded by the cover portion 61 of the auxiliary machine stay 60 and the ACG cover 210 is the breather chamber 67. A rear surface of the breather chamber 67 is surrounded by the ACG cover 210, and a front surface and an outer peripheral surface of the breather chamber 67 as viewed in the front-rear direction are surrounded by the cover portion 61 of the auxiliary machine stay 60.

Accordingly, since the auxiliary machine stay 60 can also be utilized as a member that forms the breather chamber 67, the number of components can be reduced.

Figure 4:
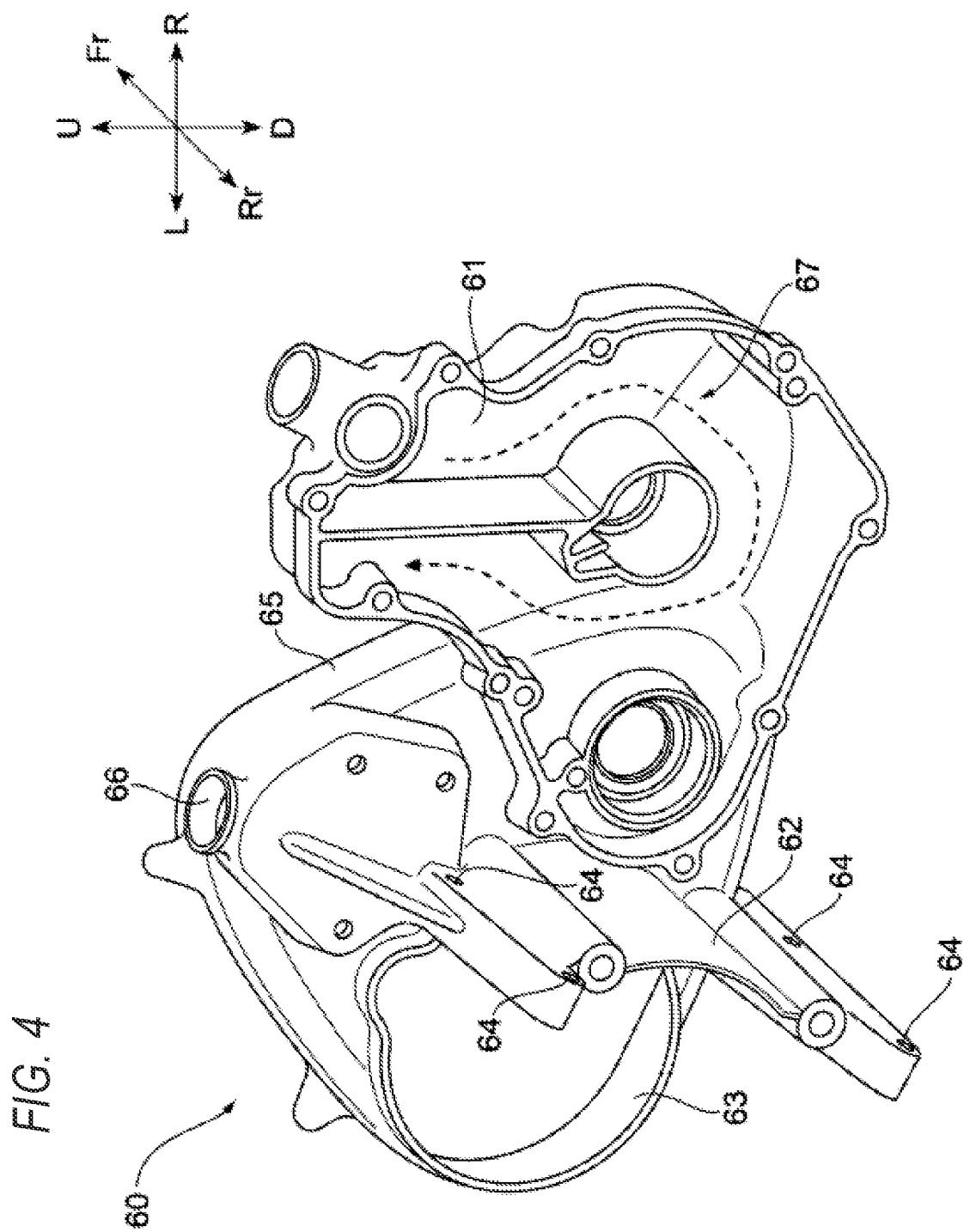
FIG. 4 is a perspective view of an auxiliary machine stay of the power unit in FIG. 2.
Figure 5:
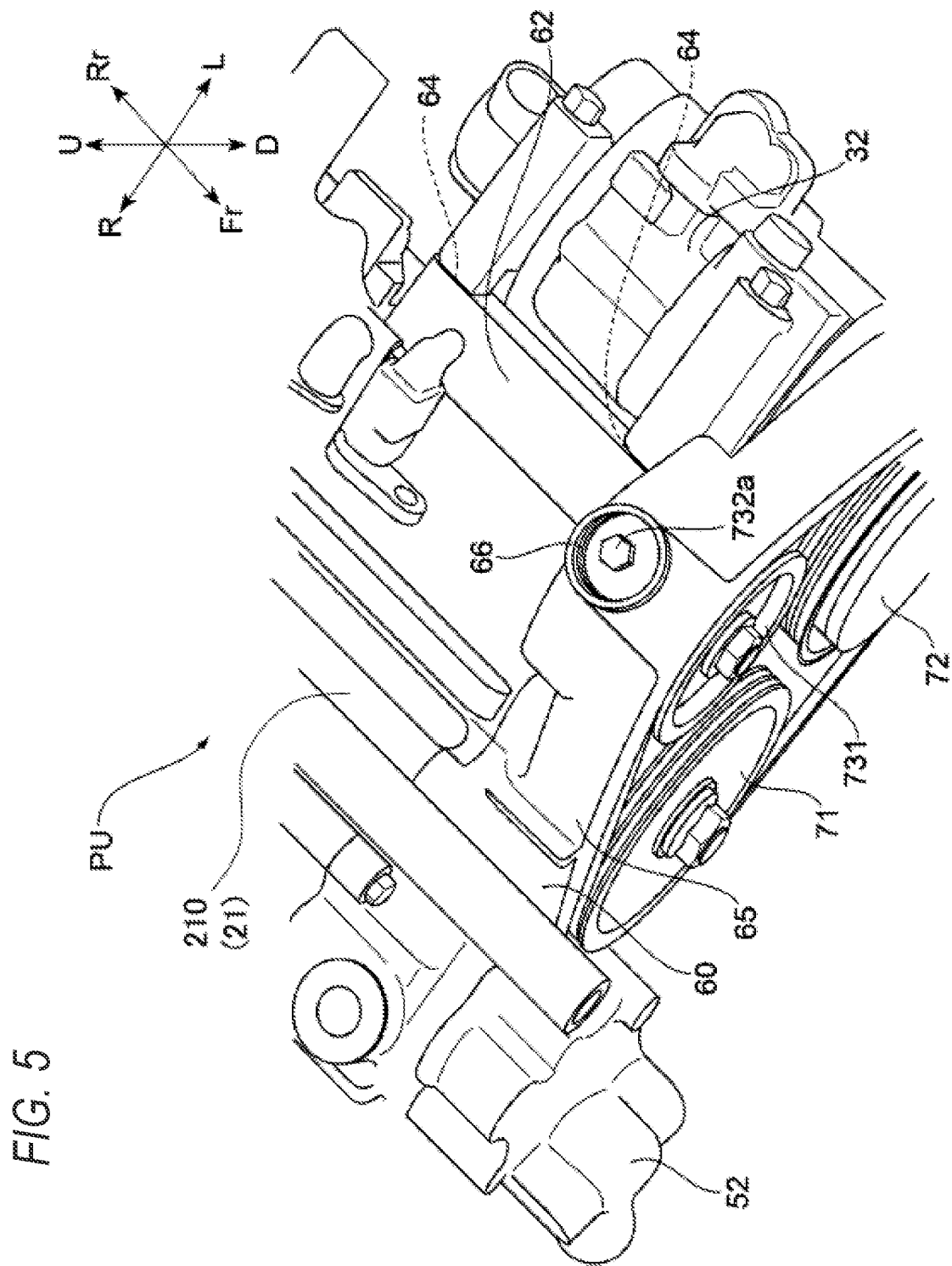
FIG. 5 is a perspective view of the vicinity of a transmission device of the power unit in FIG. 2, as viewed from above.
Figure 6:
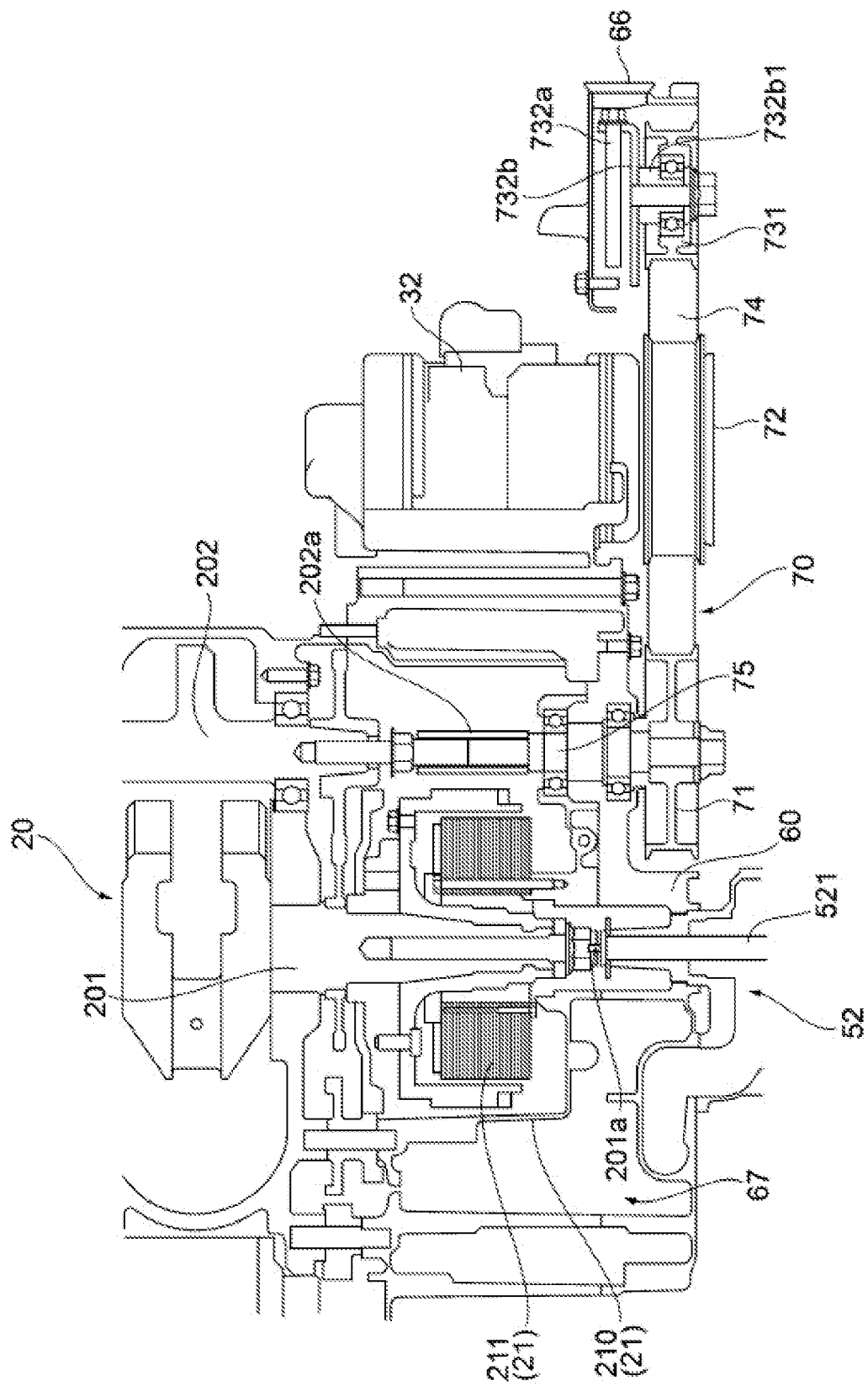
FIG. 6 is a sectional view of a main part taken along a line A-A in FIG. 2.

The ACG cover 210 is provided with an inflow portion 210a through which a blow-by gas flows from the inside of the crankcase 200 of the internal combustion engine 20 toward the breather chamber 67, and a discharge portion 210b through which the blow-by gas flowing through the breather chamber 67 is discharged to the outside of the power unit PU. The blow-by gas flowing from the inside of the crankcase 200 of the internal combustion engine 20 into the breather chamber 67 through the inflow portion 210a of the ACG cover 210 flows through the breather chamber 67 as indicated by a dashed arrow in FIG. 4, is discharged from the discharge portion 210b of the ACG cover 210, and then returns to a combustion chamber of the internal combustion engine 20 by a hose or the like (not shown).

The power unit PU further includes the water pump 52 that operates on the rotational power of the crankshaft 201 of the internal combustion engine 20. Accordingly, the internal combustion engine coolant for cooling the internal combustion engine 20 can be circulated by the rotational power of the crankshaft 201 of the internal combustion engine 20.

Therefore, the power unit PU can operate the compressor 32 with the rotational power of the balancer shaft 202 and operate the water pump 52 with the rotational power of the crankshaft 201. Accordingly, the rotational power of the balancer shaft 202 and the rotational power of the crankshaft 201 are effectively utilized, and the plurality of auxiliary machines can be attached to the power unit PU so that the influence on one another during operation is reduced.

The water pump 52 is provided at a position overlapping the crankshaft 201 when viewed in the front-rear direction, and is supported by the auxiliary machine stay 60. In the present embodiment, the water pump 52 is attached to the front surface of the cover portion 61 of the auxiliary machine stay 60. Therefore, the water pump 52 is provided at a position where at least a part of the water pump 52 overlaps the ACG unit 21 when viewed from the front.

Accordingly, since the plurality of auxiliary machines can be supported by the auxiliary machine stay 60, the number of components of the power unit PU can be reduced.

In the present embodiment, a front end of the crankshaft 201 is provided with the coupling portion 201a capable of coupling the drive shaft 521 of the water pump 52, and the drive shaft 521 of the water pump 52 is detachably coupled to the coupling portion 201a of the crankshaft 201.

Therefore, the water pump 52 can be easily attached to and detached from the power unit PU.

Since the ACG unit 21 is disposed so as to face the water pump 52 with the auxiliary machine stay 60 interposed therebetween, the ACG unit 21 can be cooled by the internal combustion engine coolant flowing through the water pump 52, and the cooling performance of the ACG unit 21 is improved.

(Arrangement of Power Unit in Vehicle)

Next, the arrangement of the power unit PU in the vehicle will be described with reference to FIGS. 7 to 10.

Figure 7:
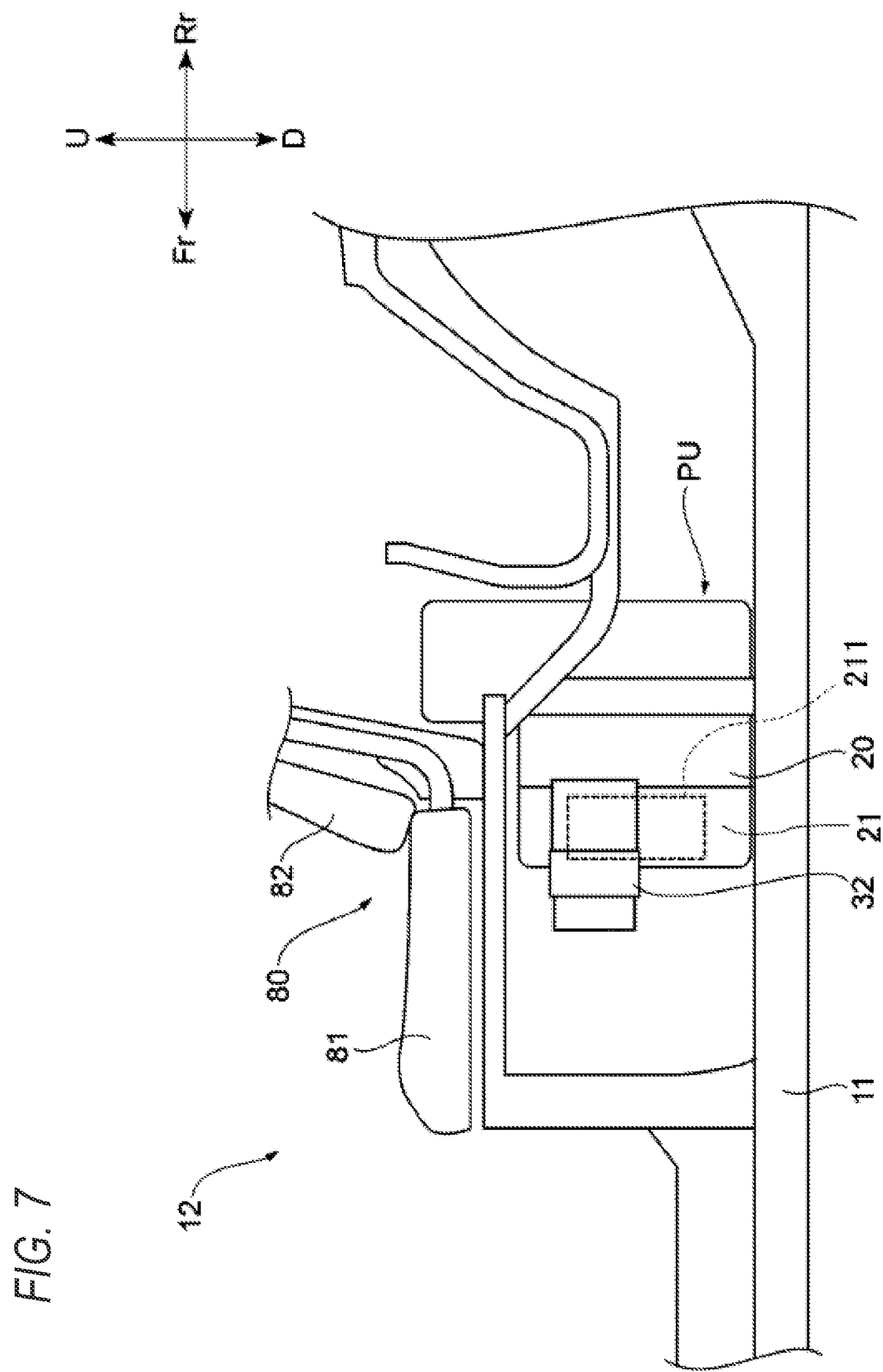
FIG. 7 is an enlarged view of a main part in the vicinity of the power unit in FIG. 1.

As shown in FIG. 7, the power unit PU is provided below the floor panel 13 such that at least a part of the power unit PU is below the seat 80. The lower side of the power unit PU is covered with an under panel 15 (see FIG. 1).

The power unit PU is disposed between the front wheel FW and the rear wheel RW in the front-rear direction, and is disposed to place the compressor 32 below the seat 80. The seat 80 includes a seat portion 81 and a backrest portion 82.

Accordingly, since both the internal combustion engine 20 and the compressor 32, which are heavy objects, can be disposed in the vicinity of the center of the vehicle in the front-rear direction of the vehicle V. and the compressor 32 can be disposed below the vehicle V in the upper-lower direction, the position of the center of gravity of the vehicle V can be set to a low position in the vicinity of the center of the vehicle.

The compressor 32 is disposed forward than a rear end portion of the seat 80 in the front-rear direction. Specifically, the compressor 32 is disposed forward than the rear end portion of the seat 80 including the seat portion 81 and the backrest portion 82 (in the present embodiment, a rear end portion of the backrest portion 82).

Accordingly, a space behind the seat 80 can be enlarged.

In more detail, the compressor 32 is disposed within a front-rear width of the seat 80 in the front-rear direction. Specifically, the compressor 32 is disposed within the front-rear width of the seat 80 including the seat portion 81 and the backrest portion 82.

Accordingly, since the compressor 32 can be disposed by effectively utilizing the space below the seat 80, the space of the vehicle cabin 12 of the vehicle V can be enlarged.

Figure 8:
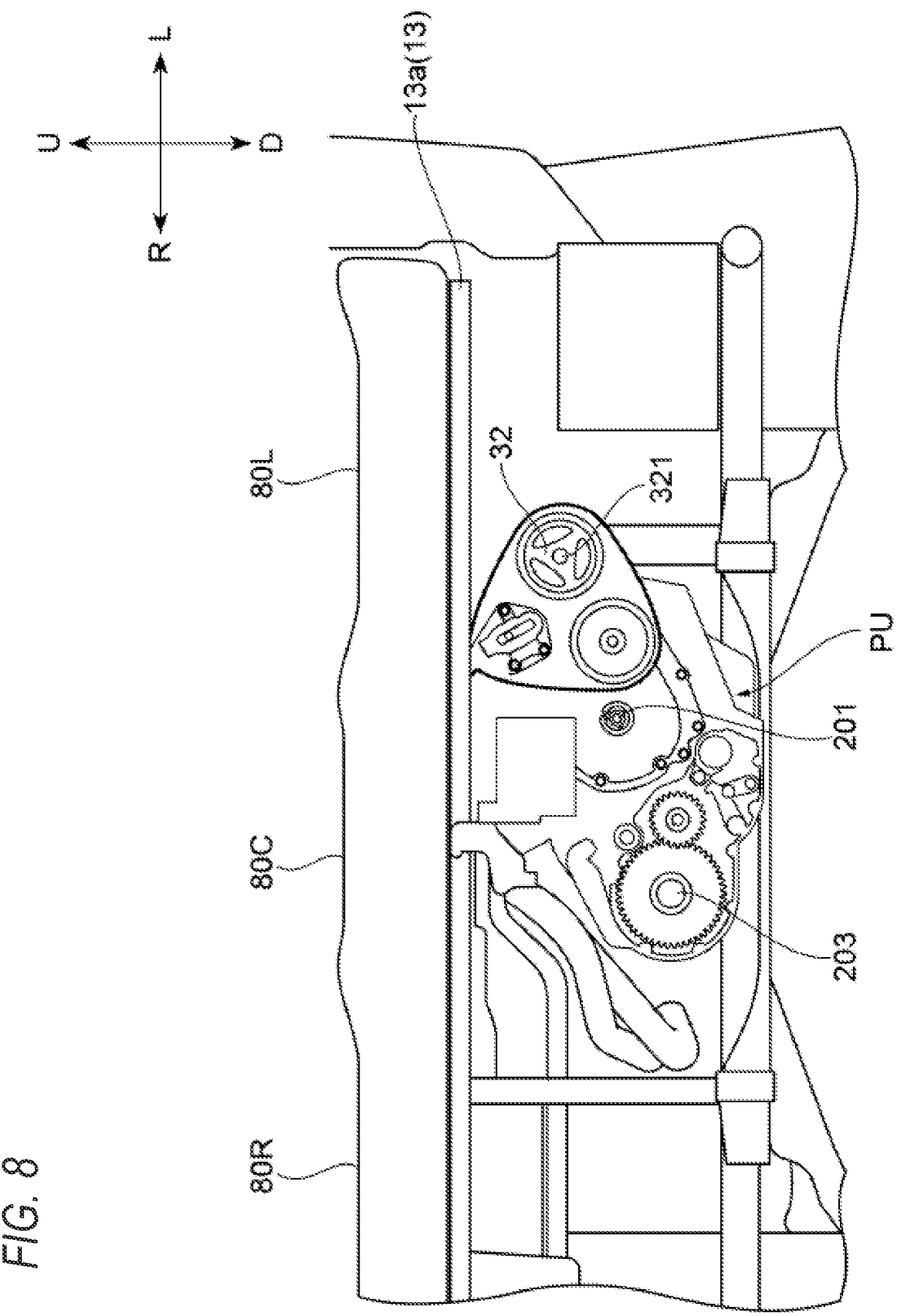
FIG. 8 is a sectional view of a main part below a seat of the vehicle in FIG. 1 as viewed from the front.

As shown in FIG. 8, the compressor 32 is disposed to the left of the crankshaft 201, and the output shaft 203 of the internal combustion engine 20 is disposed to the right of the crankshaft 201.

As explained above, the compressor 32 is disposed on one side of the crankshaft 201 in the left-right direction, and the output shaft 203 of the internal combustion engine 20 is disposed on the other side of the crankshaft 201 in the left-right direction, whereby the compressor 32 and the output shaft 203 of the internal combustion engine, the compressor 32 and the internal combustion engine being heavy objects, can be disposed separately to the left and right of the vehicle V with the crankshaft 201 interposed therebetween. Accordingly, it is possible to mount the power unit PU on the vehicle V while maintaining a good weight balance in the left-right direction of the vehicle V.

The rotary shaft 321 of the compressor 32 is disposed above the crankshaft 201 in the upper-lower direction. Therefore, the rotary shaft 321 of the compressor 32 is disposed at the upper left of the crankshaft 201 when viewed in the front-rear direction.

Accordingly, since the compressor 32 can be disposed at a higher position, the compressor 32 can be prevented from being immersed in water when the vehicle V travels on a rough road or the like.

On the other hand, the output shaft 203 of the internal combustion engine 20 is disposed below the crankshaft 201 in the upper-lower direction. Therefore, the output shaft 203 of the internal combustion engine 20 is disposed at the lower right of the crankshaft 201 when viewed in the front-rear direction.

Figure 11:
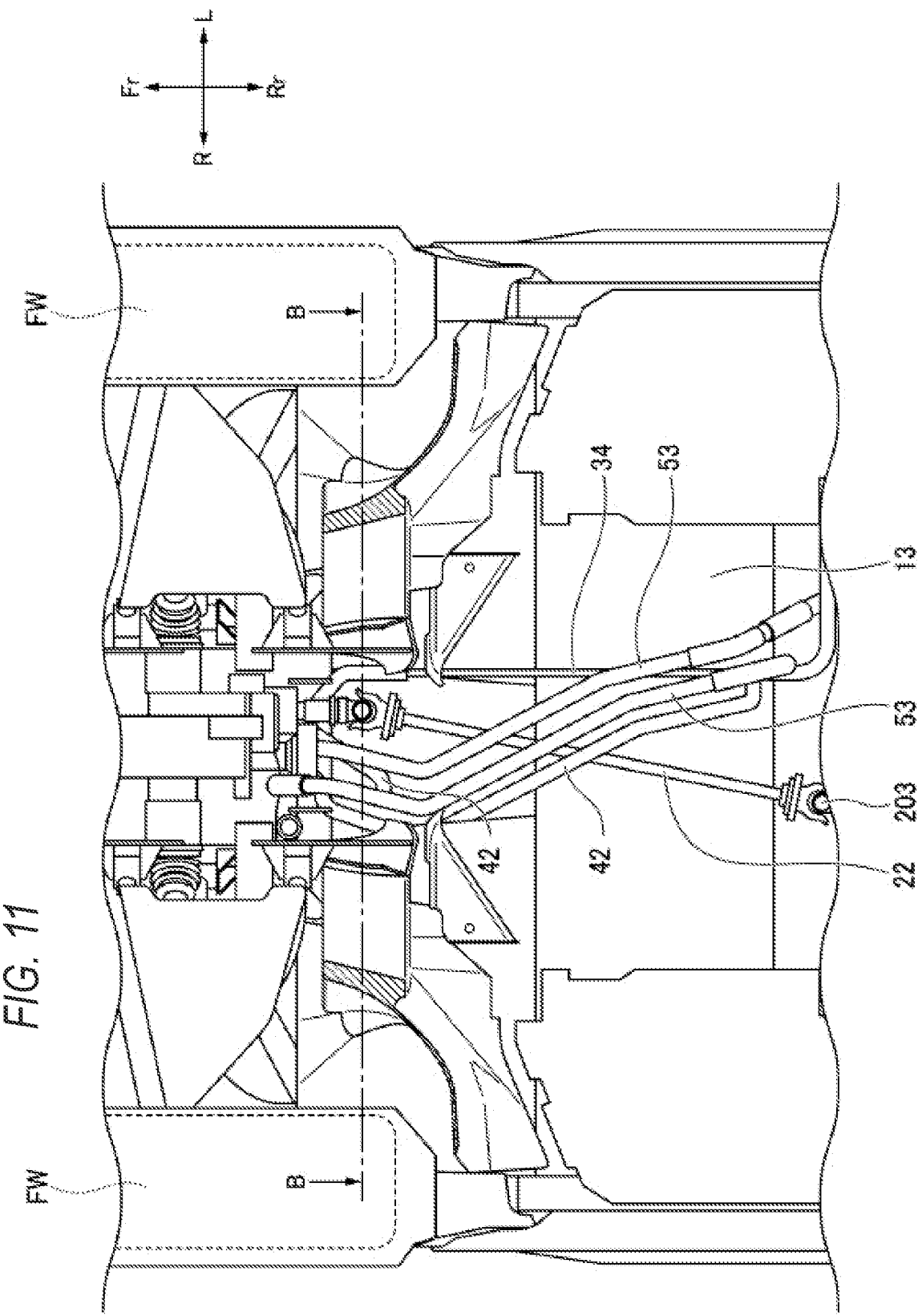
FIG. 11 is a view of the vehicle in FIG. 1 with an under panel removed, as viewed from below.
Figure 12:
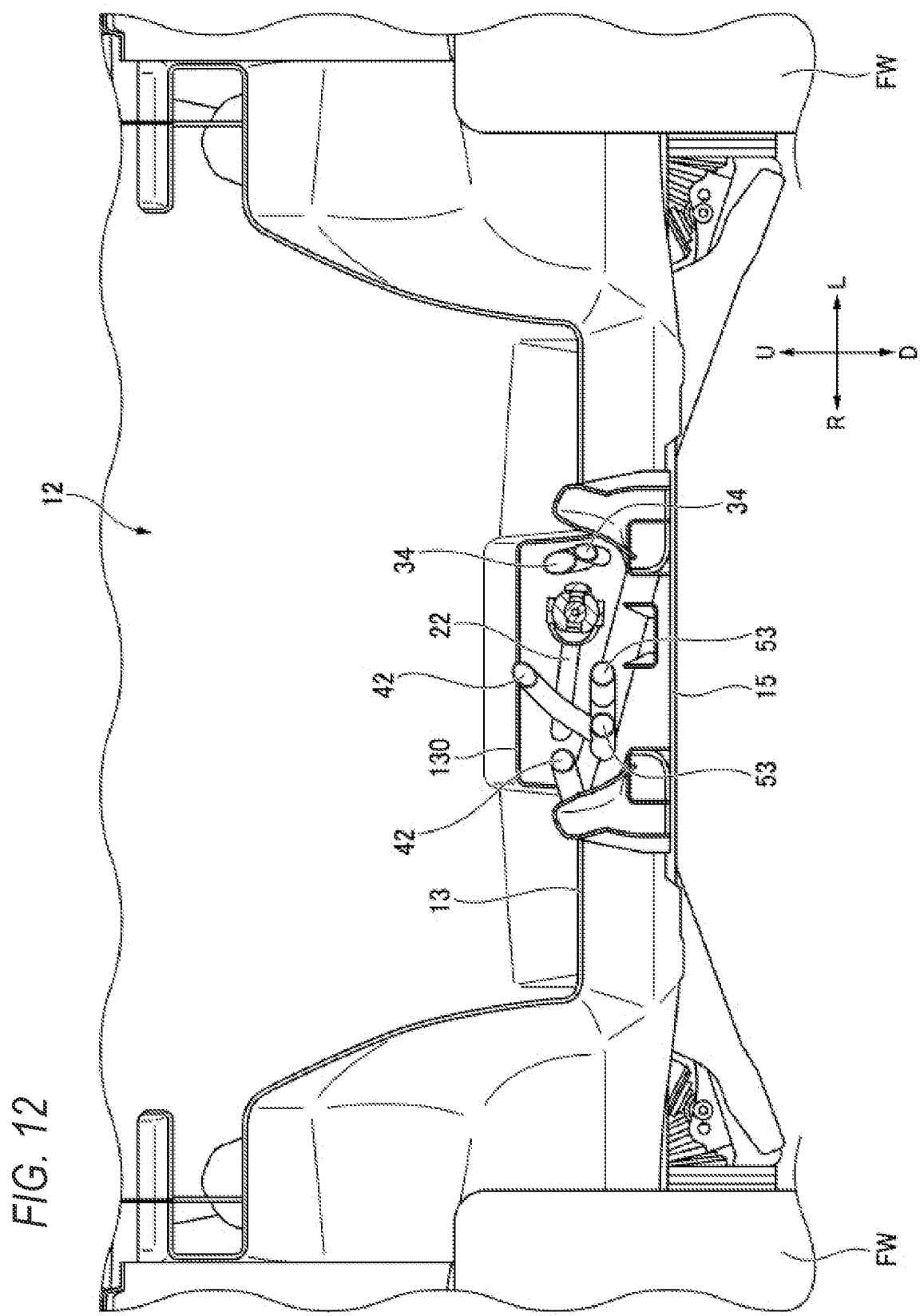
FIG. 12 is a sectional view taken along a line B-B in FIG. 11.

Therefore, since the output shaft 203 of the internal combustion engine 20 can be disposed at a lower position, the propeller shaft 22 coupled to the output shaft 203 can be disposed at a lower position so as to extend in the front-rear direction as shown in FIGS. 11 and 12. Accordingly, since a height of a center tunnel 130 formed in the floor panel 13 in the upper-lower direction can be further reduced, the space of the vehicle cabin 12 of the vehicle V can be enlarged.

The vehicle V includes a plurality of the seats 80 aligned in the left-right direction. In the present embodiment, a left seat 80L, a center seat 80C, and a right seat 80R are aligned in the left-right direction.

The output shaft 203 of the internal combustion engine 20 and the compressor 32 are disposed below different seats 80 when viewed in the front-rear direction. In the present embodiment, the output shaft 203 of the internal combustion engine 20 is disposed below the center seat 80C when viewed in the front-rear direction, and the compressor 32 is disposed below the left seat 80L when viewed in the front-rear direction.

Thus, since the compressor 32 is disposed below the seat 80 that is different from the seat 80 located above the output shaft 203 of the internal combustion engine 20, it is possible to dispose the compressor 32 by effectively utilizing the space below the seat 80 that is different from the seat 80 located above the output shaft 203 of the internal combustion engine 20. Accordingly, the compressor 32 can be disposed at a lower position, and the position of the center of gravity of the vehicle V can be set to a lower position. Further, since the compressor 32 and the output shaft 203 of the internal combustion engine, the compressor 32 and the internal combustion engine being heavy objects, can be disposed separately to the left and right of the vehicle V, it is possible to mount the power unit PU on the vehicle V while maintaining a good weight balance in the left-right direction of the vehicle V.

Figure 9:
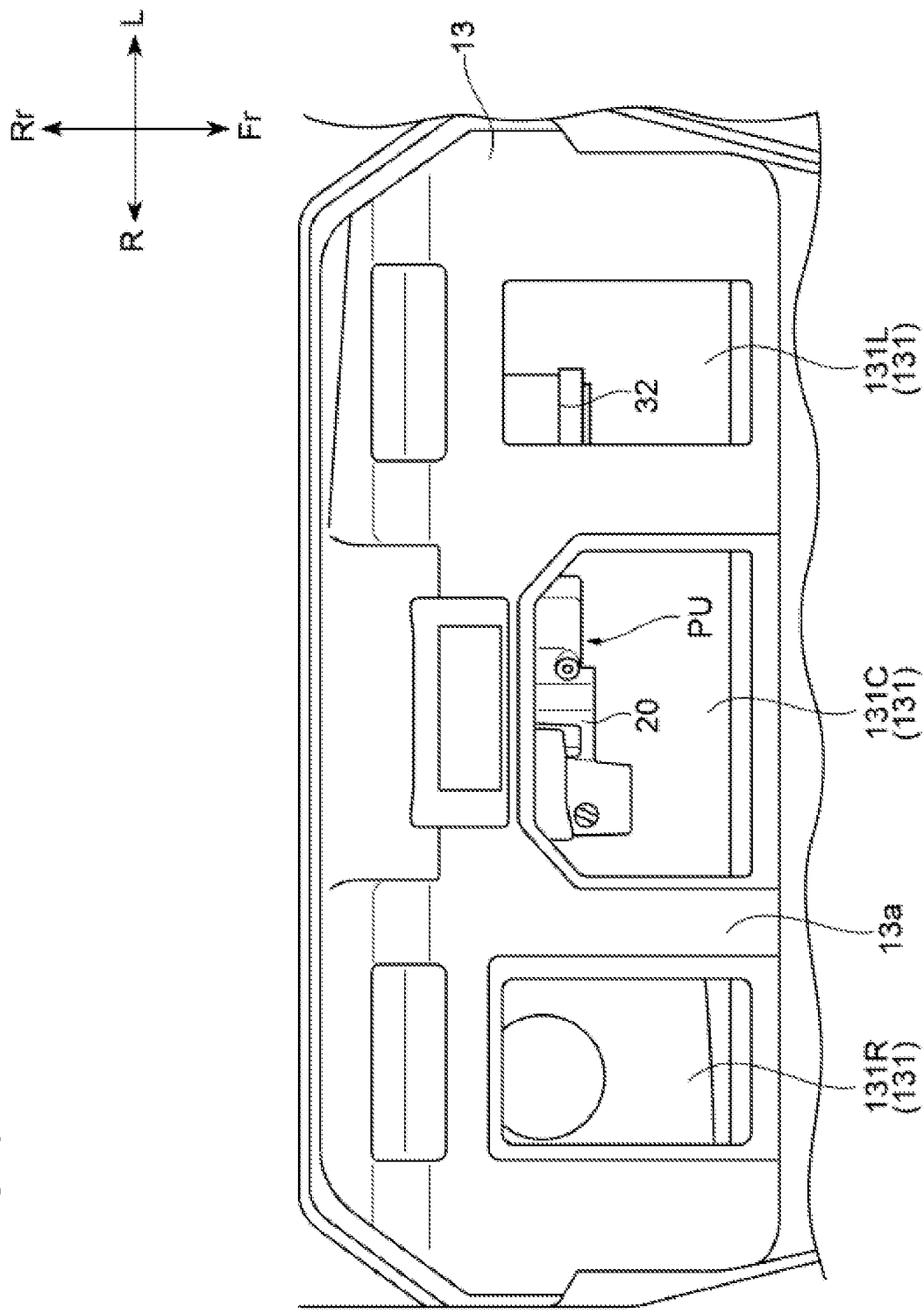
FIG. 9 is a view of a main part of an under-seat region of a floor panel of the vehicle in FIG. 1 as viewed from above.

As shown in FIG. 9, the floor panel 13 is provided with openings 131 that are opened in the upper-lower direction at an under-seat region 13a that overlaps the seat 80 when viewed in the upper-lower direction. In the present embodiment, in the under-seat region 13a of the floor panel 13, a left opening 131L is provided at a region overlapping the left seat 80L, a center opening 131C is provided at a region overlapping the center seat 80C, and a right opening 131R is provided at a region overlapping the right seat 80R when viewed in the upper-lower direction.

The power unit PU is disposed at a position where at least a part of the power unit PU overlaps the openings 131 when viewed in the upper-lower direction. In detail, the power unit PU is disposed at a position where at least the part of the power unit PU overlaps at least one of the left opening 131L, the central opening 131C, and the right opening 131R when viewed in the upper-lower direction. In the present embodiment, the power unit PU is disposed at a position where a part of the power unit PU overlaps the central opening 131C and a part of the power unit PU overlaps the left opening 131L when viewed in the upper-lower direction.

Accordingly, since the power unit PU can be easily accessed from above the floor panel 13 through the opening 131, maintenance of the power unit PU is facilitated.

Further, as described above, since the through hole 66 accessible to the belt tensioner 73 of the transmission device 70 is provided in the upper portion of the accommodation wall 65 provided at the cover portion 61 of the auxiliary machine stay 60, the belt tensioner 73 of the transmission device 70 can be easily accessed from above the floor panel 13 through the opening 131 of the floor panel 13 and the through hole 66 provided in the upper portion of the accommodation wall 65 of the auxiliary machine stay 60. Accordingly, the transmission belt 74 of the transmission device 70 can be easily adjusted.

The compressor 32 is disposed at a position where at least a part of the compressor 32 overlaps the opening 131 when viewed in the upper-lower direction. In the present embodiment, the compressor 32 is disposed at a position where at least the part of the compressor 32 overlaps the left opening 131L when viewed in the upper-lower direction.

Accordingly, since the compressor 32 can be easily accessed from above the floor panel 13 through the opening 131, maintenance of the compressor 32 is facilitated.

Figure 10:
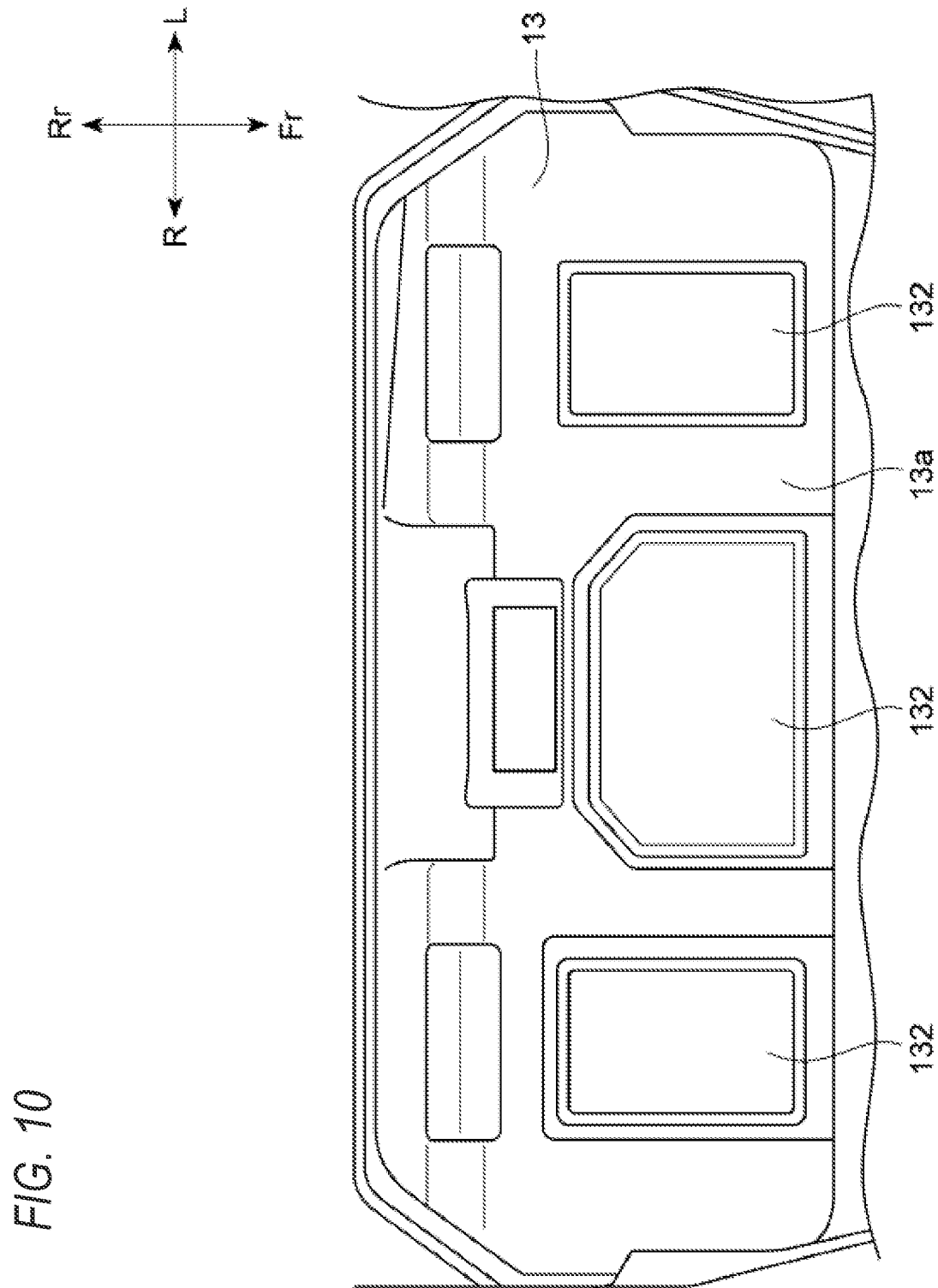
FIG. 10 is a view of the under-seat region of the floor panel of the vehicle in FIG. 1 in a state in which a cover member is attached, as viewed from above.

As shown in FIG. 10, the vehicle V includes a cover member 132 that seals the openings 131 formed in the floor panel 13. During traveling of the vehicle V, the openings 131 formed in the floor panel 13 are sealed by the cover member 132.

Accordingly, during traveling of the vehicle V, it is possible to prevent heat generated in the internal combustion engine 20 and the compressor 32 of the power unit PU from entering the vehicle cabin 12.

Although one embodiment of the present disclosure has been described above with reference to the accompanying drawings, it is needless to say that the present invention is not limited to the embodiment. It is apparent that those skilled in the art can conceive of various modifications and alterations within the scope described in the claims, and it is also understood that such modifications and alterations naturally fall within the technical scope of the present invention. In addition, constituent elements in the embodiment described above may be combined freely within a range not departing from the spirit of the present invention.

For example, in the present embodiment, a front side of the transmission device accommodating portion 650 is opened. Accordingly, since traveling wind is supplied to the transmission device 70 during traveling of the vehicle, the cooling performance of the transmission device 70 is improved.

Figure 13:
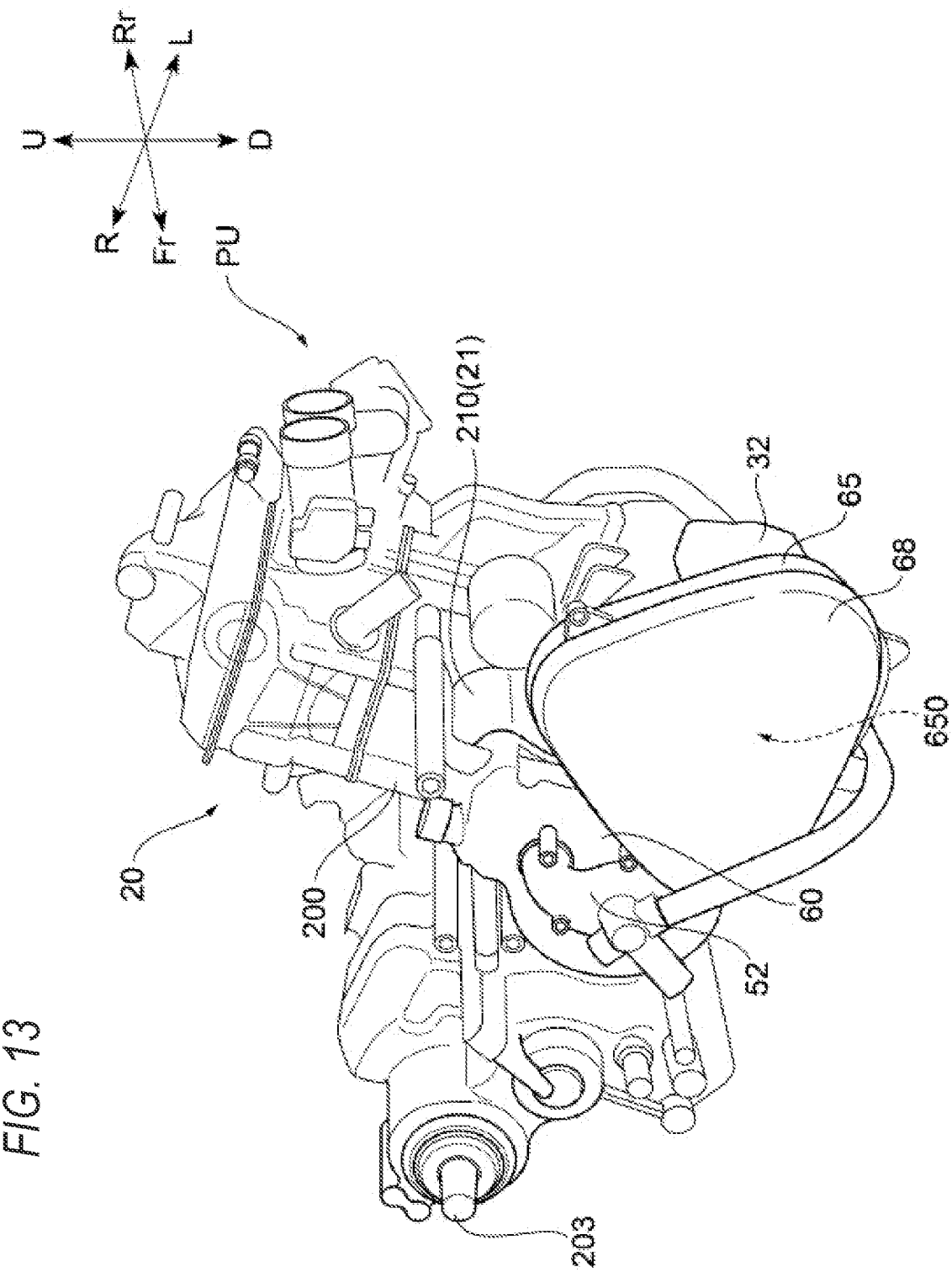
FIG. 13 is a perspective view showing a modified example of the power unit in FIG. 2.

On the other hand, as shown in FIG. 13, the power unit PU may further include a cover member 68 that covers the front side of the transmission device accommodating portion 650. Accordingly, during traveling of the vehicle, dust, water, and the like can be prevented from entering the transmission device 70 from the front.

For example, a rough road traveling vehicle capable of traveling on a rough road has been described as an example of the vehicle V on which the power unit according to the present embodiment is mounted, but the vehicle V on which the power unit according to the present embodiment is mounted may be, for example, a golf cart or the like, or may be a passenger car traveling on a general road. For example, the vehicle V on which the power unit according to the present embodiment is mounted may be or may not be provided with doors on left and right side surfaces. For example, in the vehicle V on which the power unit according to the present embodiment is mounted, an upper portion of the vehicle cabin 12 may be or may not be covered by a roof.

For example, the vehicle V may further include a rear seat behind the seat 80.

Since the power unit PU is disposed below the floor panel 13 such that at least a part of the power unit PU is below the seat 80, the vehicle cabin 12 can be enlarged, and a space for providing a rear seat can be secured.

In the present description, at least the following matters are described. In the parentheses, the corresponding constituent elements and the like in the above embodiment are shown as an example, and the present invention is not limited thereto.

(1) A power unit (power unit PU) including:
   an internal combustion engine (internal combustion engine 20) including a crankshaft (crankshaft 201) and a balancer shaft (balancer shaft 202); and
   a first auxiliary machine (compressor 32) configured to operate on rotational power generated in the internal combustion engine,
   in which the first auxiliary machine is driven by rotational power of the balancer shaft.

According to (1), the degree of flexibility in designing the power unit is improved without increasing the cost.

(2) The power unit according to (1),
in which the first auxiliary machine is a compressor.

According to (2), it is possible to use the compressor designed on the assumption of being driven by the rotational power of the crankshaft while ensuring durability.

(3) The power unit according to (1) or (2), further including:
a transmission device (transmission device 70) configured to transmit the rotational power of the balancer shaft to the first auxiliary machine,
in which the transmission device includes:
a drive pulley (drive pulley 71) configured to rotate by the rotational power of the balancer shaft;
a driven pulley (driven pulley 72) coupled to the first auxiliary machine and configured to rotate about a rotation axis parallel to a rotation axis of the drive pulley; and
a transmission belt (transmission belt 74) wound around the drive pulley and the driven pulley.

According to (3), the rotational power of the balancer shaft can be transmitted to the first auxiliary machine by the transmission device with a simple configuration.

(4) The power unit according to (3),
in which a drive shaft (drive shaft 75), which is configured to rotate integrally with the drive pulley, is detachably coupled to the balancer shaft.

According to (4), since the drive shaft of the transmission device is detachably coupled to the balancer shaft, the transmission device can be easily detached from the internal combustion engine.

(5) The power unit according to any one of (1) to (4),
in which the internal combustion engine and the first auxiliary machine are disposed to place the balancer shaft between the first auxiliary machine and the crankshaft.

According to (5), since the internal combustion engine and the first auxiliary machine are disposed to place that the balancer shaft between the first auxiliary machine and the crankshaft, it is possible to reduce the size of the transmission device.

(6) The power unit according to any one of (1) to (5), further including:
a rotary electric machine unit (ACG unit 21) including a rotary electric machine (rotary electric machine 211) capable of generating electric power by rotational power of the crankshaft; and
a second auxiliary machine (water pump 52) configured to operate on the rotational power of the crankshaft.

According to (6), the power unit can operate the first auxiliary machine on the rotational power of the balancer shaft and operate the second auxiliary machine on the rotational power of the crankshaft. Therefore, the rotational power of the balancer shaft and the rotary power of the crankshaft are effectively utilized, and the plurality of auxiliary machines can be attached to the power unit with reducing the influence on each other while the auxiliary machines operate.

(7) The power unit according to any one of (1) to (6),
in which a rotation axis of the first auxiliary machine, a rotation axis of the crankshaft, and a rotation axis of the balancer shaft are parallel to one another,
a rotation direction of the first auxiliary machine while being driven is identical to a rotation direction of the balancer shaft, and
the rotation direction of the first auxiliary machine while being driven is opposite to a rotation direction of the crankshaft.

According to (7), since a rotation direction reversing device that reverses a rotation direction, which has been used in the related art when the first auxiliary machine is driven by the rotational power of the crankshaft, can be omitted, the number of components of the power unit can be reduced, and the cost and size of the power unit can be reduced.

What is claimed is:
1. A power unit comprising:
an internal combustion engine including a crankshaft and a balancer shaft;
a first auxiliary machine configured to operate on rotational power generated in the internal combustion engine;
a transmission device configured to transmit the rotational power of the balancer shaft to the first auxiliary machine;
a rotary electric machine unit including a rotary electric machine capable of generating electric power by rotational power of the crankshaft; and
a second auxiliary machine configured to operate on the rotational power of the crankshaft,
wherein the first auxiliary machine is driven by rotational power of the balancer shaft,
wherein the transmission device includes:
a drive pulley configured to rotate by the rotational power of the balancer shaft;
a driven pulley coupled to the first auxiliary machine and configured to rotate about a rotation axis parallel to a rotation axis of the drive pulley;
a tensioner pulley configured to rotate about a rotation axis parallel to the rotation axis of the drive pulley and the rotation axis of the driven pulley; and
a transmission belt wound around the drive pulley, the driven pulley, and the tensioner pulley,
wherein a drive shaft, which is configured to rotate integrally with the drive pulley, is detachably coupled to the balancer shaft,
wherein the rotary electric machine is coupled to the crankshaft,
wherein the second auxiliary machine is driven by the crankshaft,
wherein at least a part of the second auxiliary machine overlaps the rotary electric machine unit when viewed from a front of the power unit,
wherein the internal combustion engine and the first auxiliary machine are disposed to place the balancer shaft between the first auxiliary machine and the crankshaft,
wherein the tensioner pulley is provided with a belt tensioner,
wherein the belt tensioner includes an adjuster device that pivotally supports the tensioner pulley in a displaceable manner,
wherein the adjuster device includes an adjuster bolt, a movable member that moves in accordance with a rotation of the adjuster bolt, and a support member that slidably supports the movable member, and
wherein the adjuster bolt includes a bolt head directed upward and extends in a front-rear direction while being slightly inclined leftward and downward.

2. The power unit according to claim 1,
wherein the first auxiliary machine is a compressor.

3. The power unit according to claim 1,
wherein a rotation axis of the first auxiliary machine, a rotation axis of the crankshaft, and a rotation axis of the balancer shaft are parallel to one another, a rotation direction of the first auxiliary machine while being driven is identical to a rotation direction of the balancer shaft, and
the rotation direction of the first auxiliary machine while being driven is opposite to a rotation direction of the crankshaft.

\* \* \* \* \*